United States Patent [19]

Zador et al.

[11] Patent Number: 4,642,126
[45] Date of Patent: Feb. 10, 1987

[54] COATED ABRASIVES WITH RAPIDLY CURABLE ADHESIVES AND CONTROLLABLE CURVATURE

[75] Inventors: Eugene Zador, Ballston Lake; Wesley R. Kaczmarek, Burnt Hills; Sitaramaiah Ravipati, Latham, all of N.Y.

[73] Assignee: Norton Company, Worcester, Mass.

[21] Appl. No.: 700,372

[22] Filed: Feb. 11, 1985

[51] Int. Cl.$^4$ .............................................. B24D 11/02
[52] U.S. Cl. ....................................... 51/295; 51/298; 427/54.1
[58] Field of Search ................. 51/295, 298; 427/54.1; 526/301

[56] References Cited

U.S. PATENT DOCUMENTS

| | | | |
|---|---|---|---|
| 3,450,613 | 6/1969 | Steinberg | 522/37 |
| 4,027,435 | 6/1977 | Malloy | 51/295 |
| 4,047,903 | 9/1977 | Hesse et al. | 51/295 |
| 4,082,521 | 4/1978 | McGarvey | 51/295 |
| 4,163,647 | 8/1979 | Swiatek | 51/295 |
| 4,225,321 | 9/1980 | Swiatek | 51/295 |
| 4,240,807 | 12/1980 | Kronzer | 51/295 |
| 4,382,135 | 5/1983 | Sinka et al. | 526/301 |
| 4,407,855 | 10/1983 | Russell | 427/54.1 |
| 4,553,982 | 11/1985 | Korbel et al. | 51/295 |

FOREIGN PATENT DOCUMENTS 119491 10/1978 Japan .

OTHER PUBLICATIONS

Kwok-Wai Lem et al. "Chemorheology of Thermosetting Resins, III," *J. App. Polm. Sci.*, vol. 28, p. 3207 (1983).
S. P. Pappas (ed.) UV Curing: Science & Technology, vol. 2, pp. 64–66 (1985).
A. Aldridge et al, "UV Curing of TiO$_2$ Pigmented Coatings" *J. Radiation Curing*, Jul., 1984, pp. 10–17.
H. C. Miller, "Acrylourethane Resin Design", *Radiation Curing*, May, 1984, pp. 4–9.

*Primary Examiner*—Lorenzo B. Hayes
*Assistant Examiner*—Willie J. Thompson
*Attorney, Agent, or Firm*—Frank S. Chow; Norvell E. Wisdom

[57] ABSTRACT

Previous coated abrasives with adhesives suited to rapid, UV light initiated cure often had intractable curl problems. Therefore, such coated abrasives have been unsuited to precision finishing of workpieces with strict flatness or other curvature requirements, such as read-write heads for magnetic recorders or computer memories.

This invention provides coated abrasives, having adhesives with cure initiated by UV light, which are suited to curvature control by the methods used conventionally for magnetic recording media. The preferred adhesive formulations include reaction products of 2-hydroxyethyl acrylate with polyol polyester oligomers capped with isocyanate end groups, alkoxylated diacrylated monomers, and N-vinyl pyrrolidone and other monomers with only one polymerizable unsaturated double bond per molecule, and sometimes also include nonpolymerizable thermoplastic polymers. The adhesives, with abrasives grain dispersed therein, are milled in special mills combining the actions of small milling media with large scale high speed agitation to reduce their viscosity to a workable level for gravure roll coating. The dispersion is then coated on plastic film backings and cured with UV lamps having a high spectral output in the near UV, the backing being kept cool during cure by contact with a cooled metal roll. The warm coated abrasive thus formed is finally shaped into accurately flat or other controlled curvature.

20 Claims, 1 Drawing Figure

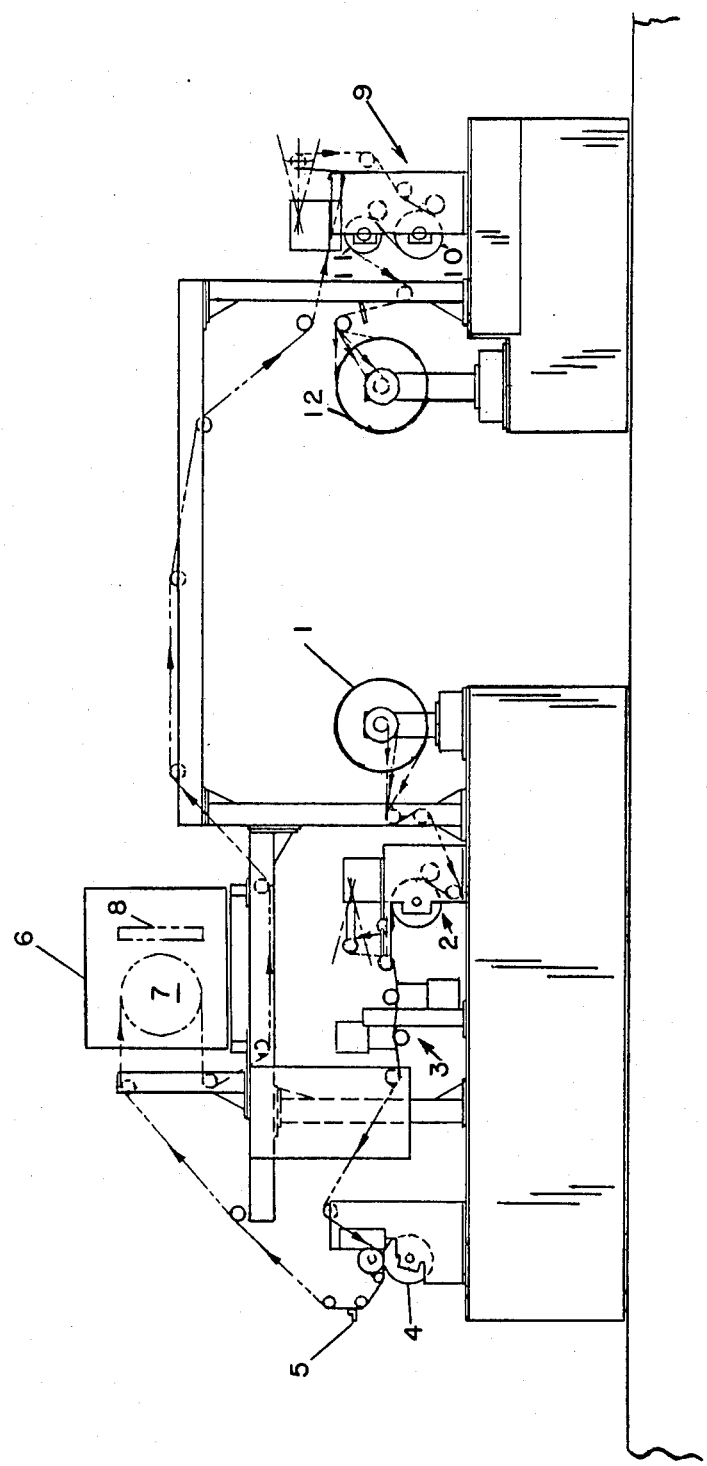

COATED ABRASIVES WITH RAPIDLY CURABLE ADHESIVES AND CONTROLLABLE CURVATURE

BACKGROUND OF THE INVENTION

1. Field of the Invention

This invention relates to the provision of coated abrasives, particularly those suitable for precise surface texturizing, fine finishing and/or burnishing of surfaces to precise tolerances with respect to both smoothness and curvature. Coated abrasives generally comprise a flexible web backing and a layer of abrasive grain which is attached by one or more layers of adhesive to at least one of the major surfaces of the backing. The products provided by this invention are most particularly suited to finishing the read-write heads used in conjunction with recording discs or tapes, laser components of optical character readers and pattern scanners, and electromagnetic recording media such as the floppy and hard discs used in computers. This invention also relates to the field of radiation curable adhesives.

2. Technical Background

In the prior art, most coated abrasives have been made with adhesives of animal glue or of synthetic resins, usually thermosetting resins such as urea-formaldehyde or phenol-formaldehyde. The vast majority of prior art coated abrasives have also been backed with fabrics or with cellulosic non-fabric webs such as paper or vulcanized fiber. Such products are suited to known processes of curl correction which involve control of the moisture content of the backing combined with flexing, a mechanical process which forces the coated abrasive web to pass over one or more surfaces with a small radius of curvature. Conventional flexing processes are performed at ambient temperature and usually without any source of mechanical pressure on the side of the web bearing abrasive grain. Conventional flexing breaks the abrasive coating up into small "islands" and allows the curvature of the entire coated abrasive product to be controlled essentially by the curvature of the backing alone.

These known curvature control processes are satisfactory for the types of coated abrasives already noted, but they are not generally satisfactory for coated abrasives with solid plastic films backings and adhesives suitable for rapid curing induced by radiation. Solid plastic film backings are preferred for applications requiring precise dimensional control of the finished objects, because the plastic can be economically obtained with very smooth and flat surfaces. Adhesives suitable for rapid curing induced by radiation are preferred for economy and speed of manufacture, as further explained at lines 7–23 of page 1 of application Ser. No. 680,619 entitled "Improved Coated Abrasive with Rapidly Curable Adhesives" and filed Dec. 7, 1984 now abandoned. This application is briefly cited hereinafter as Supkis, the first inventor listed on the application.

The only published instance of a coated abrasive prepared by UV curing known to us is in Japanese Laid-Open Application No. 119491/1978, dated Oct. 18, 1978. This document indicated that the presence of an isocyanate compound in the adhesive is important for success with UV light initiated cure of adhesives for coated abrasives. Furthermore, although it was generally asserted in this Japanese publication that all the formulations disclosed therein are suitable for cure by UV light as well as electron beam curing, only one of the sixteen specific examples actually used UV light.

A waterproof paper coated abrasive with fast curing adhesives was disclosed in U.S. Pat. No. 4,047,903 to Hesse et al., but this product was cured by electron beam radiation only.

The above cited Supkis application describes general purpose coated abrasives with radiation curable adhesives and also certain specific embodiments adapted to lens fining operations. It has been found that these embodiments are often insufficiently flat as produced to be satisfactory for finishing of objects which require very high flatness, or other precisely controlled curvature, over their surfaces in order to operate satisfactorily. In order to achieve precise curvature on a workpiece, the coated abrasive used to finish it must be capable of approximately equally precise curvature control. Such control over the curvature of the plastic film backed products described in the Supkis application has not been achieved with normal curl correction processes used for conventional coated abrasives. (It is suspected, although not investigated by us, that the initial lack of flatness of these Supkis products is connected with the tendency of radiation curable adhesives to shrink upon cure.) It is an object of the present invention to provide products with radiation curable adhesives susceptible to precise curvature control.

The general problem of controlling the shrinkage of thermosetting resins upon cure by addition of thermoplastic resins has been treated by numerous workers. One recent example is Kwok-Wai Lem and Chang Dae Han, "Chemorheology of Thermosetting Resins. III. Effect of Low Profile Additive on the Chemorheology and Curing Kinetics of Unsaturated Polyester Resins", 28 *Journal of Applied Polymer Science* 3207–3225 (1983). This article notes on page 3207 that "the mechanism(s) by which low-profile additives reduce shrinkage in . . . thermosetting . . . compounds is still not clearly understood today." In view of this and other literature known to the applicants, little or nothing about shrinkage prevention in one type of base resin can be inferred from specific data obtained with another type.

U.S. Pat. No. 4,407,855 to Russell describes the preparation of abrasion resistant, radiation curable coatings from cellulose esters and pentaerythritol acrylates. A weight ratio of acrylate to cellulose esters between six and one hundred is specified. No suggestion of any application of the adhesive compositions disclosed in the Russell patent to coated abrasives is made in the specification of the patent.

The use of dopants in addition to mercury to increase the amount of light in the wavelength range between 366 and 420 nanometers (nm) in the emission spectrum of ultraviolet (hereinafter UV) lamps is described in S. Peter Pappas (editor), *UV CURING: Science and Technology*, Vol. II, p. 64–66 (1985). An example of the use of such lamps to cure pigmented radiation curable adhesives, in this case a mixture of acrylated epoxy resin and n-butyl acrylate pigmented with titania, is A. Aldridge, P. Francis, and J. Hutchison, "UV Curing of $TiO_2$ Pigmented Coatings; Evaluation of Lamps with Differing Spectral Characteristics", 11(3) *Journal of Radiation Curing* 10 (July 1984).

SUMMARY OF THE INVENTION

We have found that coated abrasives with rapidly curable adhesives and suitability for precise curvature control can be made by utilizing adhesive compositions and curing process conditions different from those previously known. Details are given below. The features believed most important are: (1) using acrylated urethane oligomers, with polyester urethanes preferred; (2) using mixtures of di- and mono-acrylated monomers for the bulk of the remaining adhesive; (3) mixing the adhesive and abrasive grain components of the product together with the aid of a mill which combines the actions of small milling media, such as are used in a ball mill, with larger scale mechanical agitation; (4) initiating cure, with UV lamps having substantial near UV emissions, while the product in the cure zone is in contact with a cooled heat-conductive surface with sufficient heat removal capacity to constrain the rise in temperature of the web which would otherwise occur as a result of the exothermicity of cure; and (5) obtaining final curvature control by heating the web after curing the adhesive, stretching the heated web to the shape desired, then chilling the web while it is still under tension by contacting the web with a cold surface.

BRIEF DESCRIPTION OF THE DRAWING

The FIGURE illustrates schematically a typical process line for continuous production of coated abrasives according to this invention.

DESCRIPTION OF THE PREFERRED EMBODIMENTS

Adhesives:

The total adhesive formulation should be sufficiently deformable that the final coated abrasive product after cure can be shaped at a temperature of not more than 130° C. into a predetermined curvature by tensile forces not sufficient to break the coated abrasive. On the other hand, the adhesive should be sufficiently rigid so that the hot coated abrasive, shaped as described above, can be cooled with shape maintenance to normal ambient temperatures, about 25° C. and will then maintain its shape at the latter temperature against normal gravity and any internal strain forces induced by cooling. This formulation of adhesives is accomplished by controlling the individual chemical and physical types of components as described below.

Diacrylated Monomers:

The largest percentage of the polymerizable components of the adhesive used for the products according to this invention are the materials generally known commercially as diacrylate monomers. We refer to these materials, which are normally made by acrylating dialcohols to the maximum extent practical, as acrylated monomers for consistency with our other terminology. (It may be noted that both our term and the more common commercial one are chemically correct, because these materials are acrylates and are produced by acrylating alcohols.) Typical commercial products of this class are 1,6-hexanediol diacrylate (hereinafter HDODA), tripropylene glycol diacrylate, neopentyl glycol diacrylate, and tetraethylene glycol diacrylate.

Diacrylated monomers bearing alkoxyl substituents which replace some of the hydrogen atoms on the alcohol portion of the "simple" diacrylated monomers such as those listed above are especially useful for our invention, and we prefer that a substantial part of the total of diacrylated monomers in the adhesives used for our invention should be of this type. Examples of the preferred type are described in U.S. Pat. No. 4,382,135 to Sinka et al., the specification of which is hereby incorporated herein by reference. A particularly preferred type is the diacrylate of dipropoxylated neopentyl glycol, the preparation of which is described in Example II of the Sinka patent. This particularly preferred diacrylated monomer is denoted briefly hereinafter as DPNGDA.

Preferably, the total amount of diacrylated monomers in the adhesive ranges between 50 and 65% by weight of the total adhesive, exclusive of any abrasive or other solids dispersed therein. Still more preferably, at least one half of the total weight of diacrylated monomers consists of monomers with at least two alkoxyl groups per molecule.

Monofunctional Monomers:

Other important polymerizable components of preferred adhesive formulations for products according to our invention are monomers with only one polymerizable carbon-carbon double bond per molecule. Many materials, such as methyl and ethyl acrylates or methacrylates, are suitable for this constituent, with N-vinyl pyrrolidone (hereinafter NVP) a preferred constituent, but one which preferably is limited in amount to no more than 20% of the total weight of adhesive, and ethoxyethoxyethyl acrylate (hereinafter EEEA) and tetrahydrofuran acrylate preferred for the balance of the monomer. The average molecular weight per polymerizable double bond of suitable monomers varies from 95 to 200, with 155–190 preferred. A total of from 5 to 25 percent by weight of the adhesive is preferably monofunctional monomers.

Acrylated Oligomers:

A part of the polymerizable components of the adhesive should preferably consist of acrylated oligomers. The "oligomer" part of this term refers to oligomers which bear functional groups suitable for reaction with acrylic acid or its derivatives. The preferred oligomers are ester-linked urethane oligomers. These materials are described in general by H. C. Miller, "Acrylourethane Resin Design", 11(2) Radiation Curing 4–9 (May 1984), and this article is hereby incorporated herein by reference. Particularly preferred for our invention are oligomers with a linear polyester polyol core, terminated with toluene diisocyanate, then reacted with 2-hydroxyethyl acrylate. An oligomer average molecular weight between 900 and 6000 is preferred. Small amounts of higher and lower oligomers, characteristically present in all practical products of this type, have no known harmful effect. Suitable preferred materials are commercially available from Thiokol Corp., Trenton, N.J. under the trademarks Uvithane 782 and 783.

The amount of acrylated oligomers preferably is between 15 and 35 percent of the total adhesive by weight.

Thermoplastic Polymers:

Preferred formulations often but not always include some thermoplastic polymer in the adhesive composition. The reason for the beneficial effect of this constituent is not known, but it may be connected with improving the adaptability of the product to curvature control. Various thermoplastic rubbers, polymethylmethacrylate, and cellulose esters and their derivatives are suitable, with cellulose acetate butyrate preferred. The particular type most preferred is CAB-381-0.5 from Eastman Kodak, which is characterized by having (1) butyrate for about 38% of the total ester groups, with the remainder acetate; (2) one hydroxyl group for each four anhydroglucose units; and (3) a falling ball viscosity of about 0.5 seconds when viscosity is determined by ASTM Method D-1343 in the solution described as Formula A in ASTM Method D-871 and converted from poises to seconds by ASTM Method D-871.

The amount of thermoplastic polymer used must be limited to avoid excessive viscosity in the slurry to be coated; generally the amount should be not more than 2.5% of the weight of the total adhesive.

Photoinitiators:

If cure of the adhesives is to be initiated by UV light as is normally preferred, the adhesive composition must contain a photoinitiator which will adequately absorb and transfer to the acrylate components the energy from the lamps used to initiate cure. Methods for determining the amounts and types of photoinitiator used are conventional in the art of UV cured surface coatings, and the same methods were found effective for purposes of the present invention. The amount of photoinitiator is generally from 0.5 to 7.0% by weight of the amount of adhesive used. The most preferred photoinitiator is 2,2-dimethoxy-2-phenyl acetophenone (hereinafter DMPA), but 2,2-diethoxyacetophenone, 2-chlorothioxanthone, benzophenone, and 1-hydroxycyclohexyl phenyl ketone may also be used, along with many others.

As known in the prior art, if electron beam rather than UV light initiation of cure is used, no photoinitiator is needed.

Surface Property Modifiers:

A normally preferred component in the adhesive formulations is a material which improves the bonding of the adhesive to the substrate and the abrasive grain. Most organosilanes and organotitanates containing at least one organic group with from 10-20 carbon atoms have this property. A particularly preferred material was tetrakis[(2,2-diallyloxymethyl)-1-butoxy] titanium di(tridecyl) monoacid phosphite (hereinafter OTI).

Various other conventional additives were employed to improve grain mixing speed, reduce viscosity, reduce foam, etc.

Colorants:

Dyes or pigments may be used if desired to color the products. However, if UV light is to be used for cure, care must be taken to select colorants which will not unduly absorb the light and thus interfere with the cure.

Abrasive Grain:

In general, abrasive grains similar to those used on conventional types of coated abrasives are preferred for the same applications. For most of the applications of products of our invention, either aluminum oxide, silicon carbide, or mixtures of chromic oxide and silicon carbide with mean particle sizes not greater than 12 microns were used. The grain, if very fine in particle size, is preferably slurried into the adhesive and makes up at least three-fifths by weight of the slurry mixture. Details for specific cases are given in the examples below.

Backings:

As already stated, plastic films such as films of polyethylene terephthalate, polyvinyl chloride, etc. are the preferred backings for products according to the present invention. Particularly preferred is polyethylene terephthalate film with a thickness of about 0.001-0.003 inch or 0.025-0.075 mm. One advantage of the present invention is that good adhesion to polyethylene terephthalate backing can be achieved without the need for any special primer on the backing. However, primed backings may be used for this invention if desired or needed in other cases.

Processing Characteristics

Mixing Adhesive and Grain:

The use of fine abrasive grain for most of the products of our invention, combined with the inherent high viscosity of most of the components of the adhesive, tends to give the slurry of adhesive and grain too much viscosity to enable easily controlled coating uniformity with weights in the proper range. We have found that this difficulty can be overcome satisfactorily by use of a special type of mixing equipment which combines the effects of a ball mill or vibratory mill, i.e., using milling media small in scale compared with the container in which they are used, with the larger scale mixing provided by discs, screws, or paddles similar in scale to the container. Typical commercial equipment satisfactory for our purposes includes MoliNEx Agitator Mills supplied by Netzsch Inc. of Exton, Pa. and Supermills supplied by Premier Mill Corp., New York, N.Y. The operation of the latter mill is described by its supplier as follows:

The premix is pumped by a variable speed positive displacement feed pump through a horizontal grinding chamber. The grinding chamber contains micro element grinding media which can occupy up to 95% of the otherwise void volume of the grinding chamber. The media are agitated by a series of disks operating at a high peripheral velocity. The premix is subjected to a combination of intense impact and high shear created by the small element media. Adjustment of the feed rate controls the residence time to control the degree of dispersion.

At the exit, product flows through slots in a heavy duty cylindrical screen which is concentric with and rotating with the grinding shaft. The centrifugal force generated by rotation prevents the grinding media from coming close to or scraping the outer wall, and the screen prevents the media from exiting with the mix.

Treatment of the mixtures described in the examples below with a mill of this type normally succeeded in reducing the viscosity by about half.

Coating and Curvature Control:

The adhesive, which preferably is mixed with the abrasive grain used for the product, may be applied to the backing by any of the variety of ways generally well known in the coated abrasive art. For example, direct roll coating, transfer roll coating, knife coating, and combinations of these could all be used.

The preferred method of coating is by gravure roll, with accessories as shown in the FIGURE. The specific machine shown was purchased from IMD Corp. of Birmingham, Ala., but it is believed that equally satisfactory equipment could be purchased from others. The machinery was assembled from components which are stated by the manufacturer to be within the scope of conventional art for the manufacture of magnetic recording media, but it has not been previously used for coated abrasive manufacture in so far as is known to us. (This machinery would not be expected to be effective for controlling the curvature of conventional abrasives, because the thermosetting adhesives employed for conventional abrasives would resist deformation at the highest temperatures reached with this equipment.)

The backing to be coated is placed on an unwind stand 1 fitted with a brake which can be adjusted to give a suitable resistance to unwinding. A pull roll assembly 2 removes the web at a controlled rate from the unwind stand roll and removes any minor deviations from flatness in the backing web as supplied, by the tension developed during pulling. The web travels along a path defined by various conventional idler and dance rolls shown but not numbered to a set of Hamilton wipers 3; these remove any sizable foreign particles which would endanger the uniformity of the coat. From the wipers the web passes to a conventional gravure coating station 4. In contrast to the conventional practice of magnetic tape coating, a metal doctor blade is preferred for use in conjunction with the gravure roll for our purposes.

Adhesive/abrasive slurry was supplied to the gravure roll from a coating pan which was kept filled to a constant level via a recirculation loop not shown. A pump in the recirculation loop maintained constant agitation of the slurry, so that settling of the denser abrasive component did not occur to any significant extent.

After receiving the wet slurry coating, the web passes through a smoothing bar assembly 5 of the type conventional for coating magnetic tapes. After smoothing, the wet coated web is passed into an illumination zone 6. This zone is walled, with narrow slots for passage of the web, so that the atmosphere inside can be controlled.

While in the illumination zone, the web is backed by a large diameter temperature control roll 7, which is supplied with chilled water at a sufficient rate to maintain the temperature of the web in contact with it considerably lower than if such a heat sink were not provided. The temperature of the web should preferably be maintained below 45° C. during curing, and temperatures at least as low as 10° C. have been used with no deleterious effect.

Light from the lamp(s) 8 strikes the wet side of the web and begins the adhesive cure. The lamps used for most of our work were Type A3 from RPC Industries, Chicago, Ill. Other lamps with strong emission in the near UV, usually obtained by doping as already discussed, should also be effective. Such lamps are available from Canrad-Hanovia, Fusion Systems, and probably from other manufacturers as well as RPC.

The radiant power of the lamp(s) 8 must be sufficient to cause the adhesive to cure to a nontacky state before the web reaches conditioner 9.

The web is guided by conventional idler and dance rolls, shown but unnumbered, from its emergence from the illumination zone 6 to the conditioner 9. (The conditioner, which controls the final shape of the web, is conventional in the art of magnetic tape manufacturer and thus will be described only briefly.) When, as is usual, a flat web is desired, the web is passed through a pressure nip with heated cylindrical metal roll 10 on one side, then shortly thereafter passes through a second pressure nip with chilled cylindrical metal roll 11 on one side. (The other side of both nips is formed by a rubber covered roll with no temperature control.) Roll 11 is driven with controlled torque so as to maintain a set tension in the web between the two nips. The web and coating are sufficiently heated by roll 10 to be susceptible to deformation under this torque, with the result that the web and coating are urged into a flat and planar shape. Roll 10 is normally maintained between 93°-130° C. The shape is then stabilized by cooling, induced by chilled roll 11, of the coating and web to a sufficiently low temperature that they no longer deform significantly under the tensions of the coating machine. Roll 11 is generally maintained at a temperature between 10° and 43° C. The flat web then passes to and is accumulated on conventional windup stand 12.

When some shape of the web other than flat is desired, rolls 10 and 11 may be appropriately shaped, and if needed a guiding surface of the proper shape may be introduced between rolls 10 and 11. Contact surfaces other than rolls also could obviously be used.

The temperatures and pressures required in the conditioning zone can readily be determined by experiment for a particular coating and backing combination, provided that the coating and backing are sufficiently deformable under heat for the process to work. In general, our preferred formulations and cure temperatures give more readily heat-deformable cured coatings than previously taught adhesives and cure conditions for coated abrasives with radiation curable adhesives or most conventional thermally cured adhesives. Surprisingly, although heat-deformability generally reduces the life and/or effectiveness of coated abrasives, the products of our invention have normally performed as well as or better than the coated abrasives previously used for the same purposes.

It will be appreciated by those skilled in the art that many variations of all these coating conditions are possible and are included within the scope of the instant invention.

The practice of the instant invention may be further understood from the following examples.

EXAMPLE 1

This example describes the preparation and use of an adhesive suitable for curing in the normal ambient atmosphere. The constituents were:

| | |
|---|---|
| Uvithane 783 | 3000 parts |
| DPNGDA | 3500 parts |
| HDODA | 2600 parts |
| NVP | 1400 parts |
| DMPA | 430 parts |
| Yellow 9Y-40 pigment | 165 parts |
| Zonyl-A | 15 parts |
| OTI | 20 parts |
| Isopropylthioxanthone (ITX) | 110 parts |
| Ethyl-4-dimethylaminobenzoate (EDMB) | 110 parts |
| Abrasive grain | 24,150 parts |

In this adhesive, Uvithane 783 is an acrylated polyester urethane oligomer with an average molecular weight of about 1200. 9Y-40 pigment, a proprietary composition of pigments and dispersants in trimethylolpropane triacrylate, is available from Penn Color, Doylestown, Pa. The exact composition of Zonyl-A is proprietary, but it is reported by its supplier, du Pont, to be a long chain aliphatic ester ethoxylate. The abrasive grain was a high purity (99.6%) monocrystalline alpha alumina, unfused, with a median particle size of 10-11 microns and at least 80% of the particles between 5 and 18 microns (Type E-550 from Norton Co., Worcester, Mass.).

The mixing procedure for the ingredients given above was begun by melting the Uvithane at 49° C., a process which usually requires several hours for substantial quantities. The DPNGDA, HDODA, and NVP were placed in a container together with the melted Uvithane and mixed with a high shear mixer for at least thirty minutes until the mixture was free of apparent gels. Zonyl A, DMPA, EDMB, and ITX were next added in that order to the previous mixture and mixed for at least ten minutes, until no undissolved particles were detected. Yellow pigment was finally added and mixed into the remainder of the liquid ingredients for a few minutes only.

The mixture was filtered through filter cartridges with a mean filtration pore size of about five microns, and the amount of liquid actually passing through the filters was measured, to allow for losses which always occurred. The amount of grain corresponding to the actual amount of liquid filtrate was then added and mixed, with a high shear mixer, into the liquid for about thirty minutes before milling. The viscosity at this stage was about 3,000 cp.

The mixed slurry was milled in a Premier Supermill with ceramic media 0.5–2.6 mm in size filling 60–75% of the free volume of the mill. The agitator tip speed was 540–720 meters per minute and the residence time of the slurry in the mill was 4–8 minutes. The viscosity was reduced by milling to about 550 cp.

A biaxially stretched polyethylene terephthalate film about 0.05 mm in thickness served as the backing for the product of this example. It was coated, using the equipment already described and shown schematically in the FIGURE with the slurry described above at a speed of about 6 meters per minute to give a coating thickness of about 0.010–0.018 mm. The "High" setting for lamp intensity was used. The temperature control roll 7 was maintained between 32°–45° C., the heated conditioner roll 10 was maintained at about 121° C., and the conditioner chill roll 11 was maintained at about 45° C. The product produced had very high flatness and was successful in finishing read-write heads for large tape recorders, with performance exceeding the previously used commercial product for this purpose.

EXAMPLE 2

This example is similar to Example 1, except that the adhesive formulation is suitable primarily for curing in an atmosphere of nitrogen or other inert gas, with atmospheric oxygen substantially excluded. The composition of the adhesive was:

| | |
|---|---|
| Uvithane 783 | 3500 parts |
| DPNGDA | 3500 parts |
| HDODA | 2500 parts |
| NVP | 1000 parts |
| DMPA | 430 parts |
| Yellow 9Y-40 pigment | 165 parts |
| Fluorad FC 430 | 20 parts |
| Dipropylene glycol dibenzoate (DPGDB) | 20 parts |
| Modaflow | 20 parts |
| OTI | 20 parts |
| Foamaster VC | 30 parts |
| Abrasive grain | 24,150 parts |

Fluorad is a trademark of the Minnesota Mining and Manufacturing Co. for fluoroaliphatic polymeric esters useful as wetting, leveling, and flow control agents in organic polymer coating systems, and FC 430 is a particular member of this class reported by its manufacturer to have nonionic surfactant activity and about 7000 centipoises (hereinafter cp) viscosity. Foamaster VC is a trademark of Diamond Shamrock Chemicals Co., Morristown, N.J. for an antifoam agent of proprietary composition. Modaflow is a trademark of Monsanto Corp. for what is believed to be an oligomer of ethyl acrylate and 2-ethylhexyl acrylate. Other tradenamed ingredients were the same as for EXAMPLE 1.

In mixing the adhesive for this example, the Fluorad was dissolved in the DPGDB in a preliminary step. The remainder of the mixing (except for omitted ingredients, the addition before the pigment of the Foamaster, and the substitution of the Fluorad solution for the Zonyl-A of Example 1), the milling, and other processing were also the same as for Example 1, except that the illumination zone 6 was filled with nitrogen gas and the lamp intensity was "Low".

EXAMPLE 3

This example describes the manufacture of a more flexible product suited for finer finishing than those made by the two previous examples. The composition of the coating was:

| | |
|---|---|
| Uvithane 782 | 175 parts |
| DPNGDA | 400 parts |
| EEEA | 100 parts |
| HDODA | 200 parts |
| Cellulose acetate butyrate sol'n | 100 parts |
| NVP | 75 parts |
| DMPA | 43 parts |
| Blue 95-79 pigment | 6 parts |
| Fluorad FC 430 | 2 parts |
| DPGDB | 2 parts |
| LICA-12 | 3 parts |
| Modaflow | 3 parts |
| Foamaster VC | 3 parts |
| Abrasive grain | 2,415 parts |

The abrasive grain in this case was the same chemical type as for Examples 1 and 2, but had a median particle size of 9 microns rather than twelve, and had at least 90% of its particles between 4 and 14 microns. Ingredients with the same names were the same as in the previous examples. Uvithane 782 is the same general type of oligomer as Uvithane 783 previously described, but the molecular weight of 782 is about 5500. The cellulose acetate butyrate solution consisted of 25 percent by weight Eastman Grade 381-0.5 cellulose acetate butyrate in NVP. Blue Pigment 95-79 is a proprietary pigment and dispersant composition in the same solvent and available from the same supplier as the yellow pigment used in Examples 1 and 2. LICA-12 is a neoalkoxy tri(dioctylphosphato) titanate available from Kenrich Petrochemical, Inc., Bayonne, N.J.

Prior to mixing this formulation, the Uvithane was melted and the Fluorad and DPGDB mixed as before. The DPNGDA, EEEA, HDODA, and NVP were mixed together, the cellulose acetate butyrate solution added to that mixture with gentle stirring, and the melted Uvithane added to the previous mixture. All these ingredients were next mixed with a high-shear mixer for about thirty minutes until the liquid was smooth and clear. The Fluorad solution, LICA-12, Modaflow, Foamaster, and DPGDB were then added in that order and mixed. Pigment was then added and the entire mix again agitated with the high shear mixer for about ten minutes. The mixture was then filtered, and grain was added after filtration and weighing, as in the previous examples.

The mixture was milled, coated, and processed under the same conditions as for Example 1, except that backing of the same type film as in Example 1 but with 0.037 mm thickness was used.

EXAMPLES 4.1–4.2

These related examples describe products varying only in the ratio of total adhesive components to abrasive grain. The formulations used were:

| | |
|---|---|
| Uvithane 783 | 3000 parts |
| DPNGDA | 3500 parts |

-continued

| | |
|---|---|
| HDODA | 2600 parts |
| NVP | 1400 parts |
| DMPA | 430 parts |
| Yellow 9Y-40 pigment | 165 parts |
| Zonyl-A | 15 parts |
| OTI | 20 parts |
| Abrasive grain for subpart .1 | 27,300 parts |
| Abrasive grain for subpart .2 | 28,350 parts |

Each ingredient in this list is the same as in Example 1, except that the abrasive grain, the amount of which is varied in the two subparts, is the same as in Example 3. Each of these formulations was mixed and milled as in Example 1, and was then coated and curvature controlled as in Example 2, except that the thickness of the backing was 0.038 mm.

Products made according to each of the subparts were tested in the precise surface texturizing of computer memory discs. The product prepared according to subpart 0.1 was marginally satisfactory, and the product prepared according to subpart 0.2 was fully satisfactory, as it more than doubled the performance of the coated abrasive previously used commercially for this purpose. In Example 4.1, the ratio of weight of the grain to the weight of the three principal adhesive constituents, namely the diacrylated monomers, the monofunctional monomers, and the acrylated oligomers, is 2.6, while for Example 4.2, the same ratio is 2.7. For this particular application at least, the higher ratio is preferable.

We claim:

1. A coated abrasive having at least one layer of adhesive comprising the cured product of liquids containing chemical unsaturation and capable of rapid, spontaneous polymerization initiated by actinic radiation, said cured adhesive being sufficiently deformable at a first temperature of not more than 130° C. to be shaped, along with the backing on which it is coated, into a predetermined curvature by the application of tensile forces less than those required to break the coated abrasive, said cured adhesive further being sufficiently rigid at a second temperature not less than 25° C. so as to cause said coated abrasive to retain at said second temperature, in the absence of mechanical forces other than those induced by natural gravity, the curvature imparted to said coated abrasive at said first temperature and maintained during cooling from said first temperature to said second temperature.

2. A coated abrasive according to claim 1, wherein said adhesive contains abrasive grain substantially uniformly dispersed throughout said adhesive, said abrasive grain consisting of particles having a median equivalent diameter of not more than twelve microns and having at least eight-tenths of the particles with equivalent diameters between 40% and 160% of the median diameter.

3. A coated abrasive according to claim 2, wherein said abrasive grain consists of white, high purity alumina having a median particle equivalent diameter of 9 microns, and said abrasive grain is present in an amount so as to have a weight ratio of said abrasive grain to the total weight of diacrylated monomers, monofunctional monomers, and acrylated oligomers in said adhesive of less than 2.7.

4. A coated abrasive according to claim 3, wherein said adhesive, in liquid form before cure and exclusive of any abrasive or other solid particle dispersed therein, comprised:
   (a) from 50 to 65 percent by weight of diacrylated monomers;
   (b) from 5 to 25 percent by weight of monofunctional monomers;
   (c) from 15 to 35 percent by weight of acrylated oligomers; and
   (d) from 0.5–7 percent by weight of a photoinitiator.

5. A coated abrasive according to claim 2, wherein said adhesive, in liquid form before cure and exclusive of any abrasive or other solid particle dispersed therein, comprised:
   (a) from 50 to 65 percent by weight of diacrylated monomers;
   (b) from 5 to 25 percent by weight of monofunctional monomers;
   (c) from 15 to 35 percent by weight of acrylated oligomers; and
   (d) from 0.5–7 percent by weight of a photoinitiator.

6. A coated abrasive according to claim 1, wherein said adhesive, in liquid form before cure and exclusive of any abrasive or other solid particle dispersed therein, comprised:
   (a) from 50 to 65 percent by weight of diacrylated monomers;
   (b) from 5 to 25 percent by weight of monofunctional monomers;
   (c) from 15 to 35 percent by weight of acrylated oligomers; and
   (d) from 0.5–7 percent by weight of a photoinitiator.

7. A coated abrasive according to claim 6, wherein said adhesive, in liquid form before cure and exclusive of any abrasive or other solid particles dispersed therein, additionally comprised not more than 2.5 percent by weight of a dissolved thermoplastic polymer not reactive in polymerization with the other constituents of said adhesive.

8. A coated abrasive according to claim 5, wherein said adhesive, in liquid form before cure and exclusive of any abrasive or other solid particles dispersed therein, additionally comprised not more than 2.5 percent by weight of a dissolved thermoplastic polymer not reactive in polymerization with the other constituents of said adhesive.

9. A coated abrasive according to claim 4, wherein said adhesive, in liquid form before cure and exclusive of any abrasive or other solid particles dispersed therein, additionally comprised not more than 2.5 percent by weight of a dissolved thermoplastic polymer not reactive in polymerization with the other constituents of said adhesive.

10. A coated abrasive according to claim 3, wherein said adhesive, in liquid form before cure and exclusive of any abrasive or other solid particles dispersed therein, additionally comprised not more than 2.5 percent by weight of a dissolved thermoplastic polymer not reactive in polymerization with the other constituents of said adhesive.

11. A coated abrasive according to claim 2, wherein said adhesive, in liquid form before cure and exclusive of any abrasive or other solid particles dispersed therein, additionally comprised not more than 2.5 percent by weight of a dissolved thermoplastic polymer not reactive in polymerization with the other constituents of said adhesive.

12. A coated abrasive according to claim 1, wherein said adhesive, in liquid form before cure and exclusive of any abrasive or other solid particles dispersed therein, additionally comprised not more than 2.5 percent by weight of a dissolved thermoplastic polymer not reactive in polymerization with the other constituents of said adhesive.

13. A coated abrasive according to claim 12, wherein said thermoplastic polymer is cellulose acetate butyrate.

14. A coated abrasive according to claim 11, wherein said thermoplastic polymer is cellulose acetate butyrate.

15. A coated abrasive according to claim 10, wherein said thermoplastic polymer is cellulose acetate butyrate.

16. A coated abrasive according to claim 9, wherein said thermoplastic polymer is cellulose acetate butyrate.

17. A coated abrasive according to claim 8, wherein said thermoplastic polymer is cellulose acetate butyrate.

18. A coated abrasive according to claim 7, wherein said thermoplastic polymer is cellulose acetate butyrate.

19. A coated abrasive according to claim 18, wherein:
   (a) at least one half by weight of said diacrylated monomers have at least two alkoxyl substituents per molecule;
   (b) said monofunctional monomers comprise N-vinyl pyrrolidone in an amount not greater than 20 percent by weight of the adhesive, exclusive of any abrasive grain or other solids dispersed therein, with the balance if any of the monofunctional monomers consisting of ethoxyethoxyethyl acrylate or tetrahydrofuran acrylate or mixtures thereof;
   (c) said acrylated oligomers have a chemical structure equivalent to that obtained by reacting a linear polyester polyol first pre-oligomer with toluene diisocyanate to form a second pre-oligomer having isocyanate end groups, then reacting the second pre-oligomer substantially completely with 2-hydroxyethyl acrylate; and
   (d) said acrylated oligomers further have an average molecular weight between 900 and 6000.

20. A coated abrasive according to claim 6, wherein:
   (a) at least one half by weight of said diacrylated monomers have at least two alkoxyl substituents per molecule;
   (b) said monofunctional monomers comprise N-vinyl pyrrolidone in an amount not greater than 20 percent by weight of the adhesive, exclusive of any abrasive grain or other solids dispersed therein, with the balance if any of the monofunctional monomers consisting of ethoxyethoxyethyl acrylate or tetrahydrofuran acrylate or mixtures thereof;
   (c) said acrylated oligomers have a chemical structure equivalent to that obtained by reacting a linear polyester polyol first pre-oligomer with toluene diisocyanate to form a second pre-oligomer having isocyanate end groups, then reacting the second pre-oligomer substantially completely with 2-hydroxyethyl acrylate; and
   (d) said acrylated oligomers further have an average molecular weight between 900 and 6000.

* * * * *